United States Patent [19]

Egawa

[11] Patent Number: 4,974,229
[45] Date of Patent: Nov. 27, 1990

[54] HIGH-FREQUENCY DISCHARGE-EXCITING LASER DEVICE

[75] Inventor: Akira Egawa, Yamanashi, Japan

[73] Assignee: Fanuc Ltd., Minamitsuru, Japan

[21] Appl. No.: 519,308

[22] Filed: May 8, 1990

Related U.S. Application Data

[63] Continuation of Ser. No. 433,440, Nov. 8, 1989, abandoned, which is a continuation of Ser. No. 231,852, filed as PCT JP87/00983 on Dec. 15, 1987, published as WO88/04848 on Jun. 30, 1988, abandoned.

[30] Foreign Application Priority Data

Dec. 22, 1986 [JP] Japan ............... 61-305773
Dec. 22, 1986 [JP] Japan ............... 61-305774

[51] Int. Cl.$^5$ .............................................. H01S 3/00
[52] U.S. Cl. ........................................ 372/38; 372/29; 372/92
[58] Field of Search ............................ 372/38, 81–83, 372/87, 88, 29, 92

[56] References Cited

U.S. PATENT DOCUMENTS

| | | | |
|---|---|---|---|
| 4,075,537 | 2/1978 | Quillfeldt | 372/81 |
| 4,075,537 | 2/1978 | Quillfeldt | 372/81 |
| 4,275,317 | 6/1981 | Laudenslacer et al. | 372/81 |
| 4,352,188 | 9/1982 | Griffith | 372/29 |
| 4,373,202 | 2/1983 | Laakmann et al. | 372/83 |
| 4,375,690 | 3/1983 | Tabata et al. | 373/88 |
| 4,375,690 | 3/1983 | Tabata et al. | 372/88 |
| 4,493,087 | 1/1985 | Laakmann et al. | 372/87 |
| 4,618,961 | 10/1986 | Sutter, Jr. | 372/83 |
| 4,730,333 | 3/1988 | Butenuth | 372/38 |

Primary Examiner—Léon Scott, Jr.
Attorney, Agent, or Firm—Staas & Halsey

[57] ABSTRACT

A high-frequency discharge-exciting laser device has an optical resonator and a laser oscillator including a laser tube (5) in which a laser medium gas is circulated. The laser device includes a high-frequency inverter (2) and a matching circuit (3) which are directly coupled to an optical resonator (7) including the laser tube (5). The high-frequency inverter is supplied with DC electric power from a DC power supply (1). The high-frequency inverter (2) and the matching circuit (3) are disposed in the same location as that of the optical resonator (7), no coaxial cable is required, and it is not necessary to take impedance matching with any coaxial cable into consideration.

6 Claims, 5 Drawing Sheets

HIGH-FREQUENCY DISCHARGE-EXCITING LASER DEVICE

This is a continuation of co-pending application Ser. No. 07/433,440 filed on Nov. 8, 1989, now abandoned of which is a continuation of Ser. No. 07/231,852 filed as PCT JP87/00983 on Dec. 15, 1987, published as W088/04848 on Jun. 30, 1988, now abandoned.

TECHNICAL FIELD

The present invention relates to a high-frequency discharge-exciting laser device having a laser oscillator including a laser tube in which a laser medium gas is circulated, and more particularly to a high-frequency discharge-exciting laser device in which a high-frequency inverter, etc. is directly coupled to an optical resonator, thereby dispensing with the need for coaxial cable.

BACKGROUND ART

High-frequency discharge-exciting laser devices are employed for increasing the efficiency of laser output. One example of such a high-frequency di-charge-exciting laser's device is illustrated in FIG. 5 of the accompanying drawings.

Designated in FIG. 5 at 1 is a DC power supply including a regulator circuit for rectifying a three-phase AC input into a DC output and keeping the DC voltage at a constant level as required. A high-frequency inverter 2 converts the DC input into a high-frequency AC output having a frequency ranging from 1 to several MHz. A matching circuit 3 of the $\pi$-type serves to gain impedance matching between the output of the high-frequency inverter 2 and a coaxial cable (described later). The coaxial cable, denoted at 4, transmits high-frequency electric power from the high-frequency inverter 2. A laser tube 5 has electrodes 6a, 6b respectively at its opposite ends, and a laser medium gas is circulated in the laser tube 5. By applying high-frequency electric power to the electrodes 6a, 6b, an electric discharge is excited to oscillate and amplify a laser beam in the axial direction. The matching circuit 3 and the laser tube 5 are placed at a considerable distance from the high-frequency inverter 2 and the like.

The coaxial cable has an impedance which is normally of 50 $\Omega$. Therefore, the coaxial cable is poor in its matching capability with the high-frequency inverter and the laser tube, and a matching arrangement such as for automatic tracking is complex and expensive. The coaxial cable causes a large high-frequency loss. Moreover, coaxial cables which can transmit high electric power are limited and expensive. The coaxial cable limits the distance by which a laser head can be spaced from a cabinet that houses the high-frequency inverter. In addition, the coaxial cable has to be shielded at its opposite ends for protection against radio disturbance.

DISCLOSURE OF THE INVENTION

It is an object of the present invention to provide a high-frequency discharge-exciting laser device in which a high-frequency inverter, etc. is directly coupled to an optical resonator, thereby dispensing with a coaxial cable, etc., and hence which is well controllable and highly reliable.

In order to solve the aforesaid problems, there is provided in accordance with the present invention a high-frequency discharge-exciting laser device having a laser oscillator including a laser tube in which a laser medium gas is circulated, comprising a DC power supply for rectifying an AC input and issuing a DC voltage, a high-frequency inverter for supplying high-frequency electric power to said laser tube, and a matching circuit for gaining impedance matching between said high-frequency inverter and said laser tube, said high-frequency inverter and said matching circuit being directly coupled to said optical resonator.

Since the high-frequency inverter and the matching circuit are disposed in the same position as that of the optical resonator, no coaxial cable is required, it is not necessary to take impedance matching with any coaxial cable into consideration, and the matching circuit is simple and inexpensive.

In order to solve the aforesaid problems, there is also provided in accordance with the present invention a high-frequency discharge-exciting laser device having a laser oscillator including a laser tube in which a laser medium gas is circulated, comprising a DC power supply for rectifying an AC input and issuing a DC voltage, a high-frequency inverter for supplying high-frequency electric power to said laser tube, and a matching circuit for gaining impedance matching between said high-frequency inverter and said laser tube, said DC power supply, said high-frequency inverter and said matching circuit being directly coupled to said optical resonator.

Inasmuch as the DC power supply, the high-frequency inverter, and the matching circuit are disposed in the same position as that of the optical resonator, no coaxial cable is required, it is not necessary to take impedance matching with any coaxial cable into consideration, and the matching circuit is simple and inexpensive.

BEST MODE FOR CARRYING OUT THE INVENTION

Figure 1:
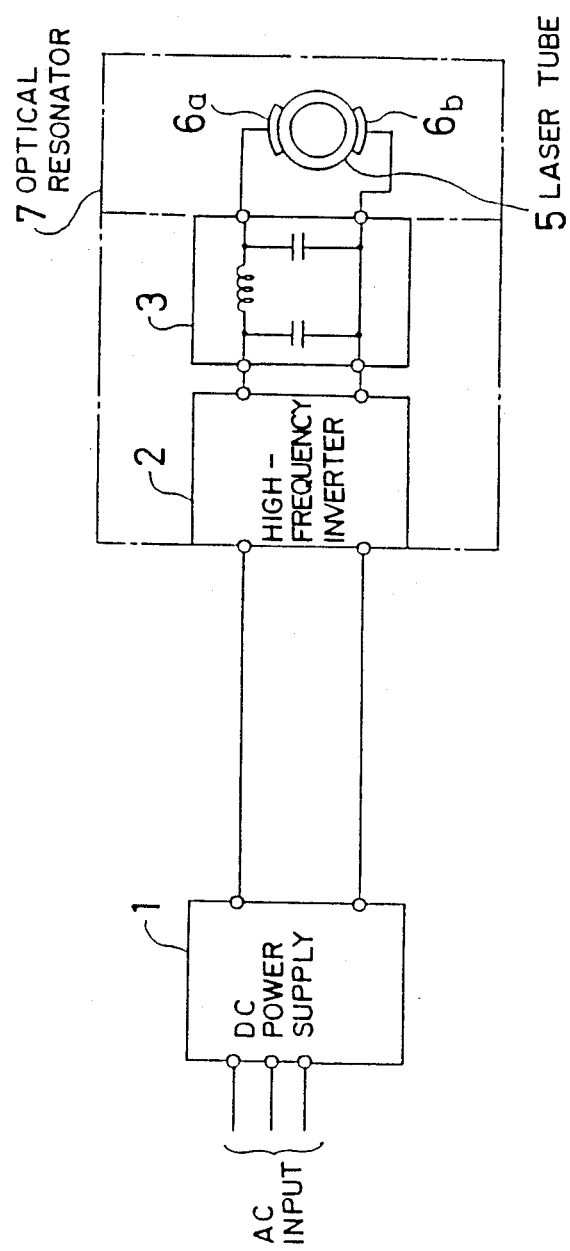
FIG. 1 is a circuit diagram of an embodiment of the present invention.
Figure 5:
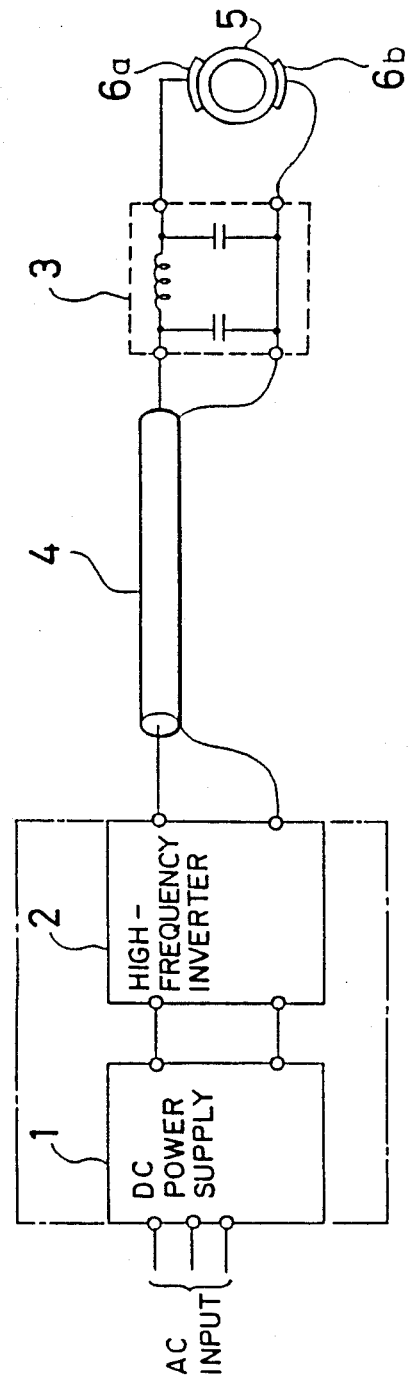
FIG. 5 is a circuit diagram of a high-frequency discharge-exciting laser device which employs a coaxial cable.

An embodiment of the present invention will hereinafter be described in specific detail with reference to the drawings. FIG. 1 is a circuit diagram of an embodiment according to the present invention. Those elements in FIG. 1 which are identical to those shown in FIG. 5 are denoted by identical reference numerals. Designated at 1 is a DC power supply including a regulator circuit for rectifying a three-phase AC input into a DC output and keeping the DC voltage at a constant level as required. A high-frequency inverter 2 converts the DC input into a high-frequency AC output having a frequency ranging from b 1 to several MHz. A matching circuit 3 of the $\pi$-type serves to gain impedance matching between the output of the high-frequency inverter 2 and a laser tube (described later). The laser tube, denoted at 5, has electrodes 6a, 6b respectively at its opposite ends, and a laser medium gas is circulated in the laser tube 5. By applying high-frequency electric power to the electrodes 6a, 6b, an electric discharge is excited to oscillate and amplify a laser beam in the axial direction. The high-frequency inverter 2 and the matching circuit 3 are disposed in the same place as that of the laser tube 5, so that the distance between the matching circuit 3 and the laser tube 5 is small and no coaxial cable is required therebetween. Impedance matching only needs to be considered between the high-frequency inverter 2 and the laser tube 5, and hence the matching circuit 3 can easily be designed for its arrangement. Any shield for protection against radio disturbance is simple as the matching circuit 3 and the laser tube 5 may be shielded together.

Figure 2:
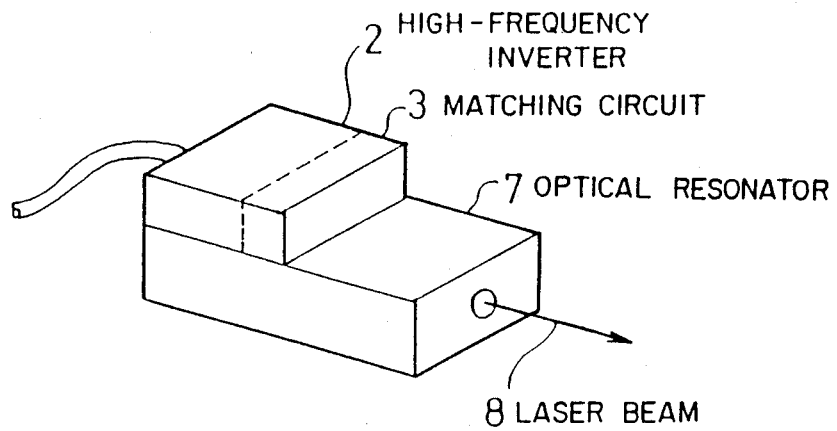
FIG. 2 is a perspective view of the embodiment of the present invention.

FIG. 2 shows in perspective the high-frequency discharge-exciting laser device of FIG. 1. The high-frequency inverter 2 and the matching circuit 3 are mounted on an upper surface of the optical resonator 7 including the laser tube 5. As shown, the distance between the matching circuit 3 and the optical resonator 7 is very small, and no coaxial cable needs to be used. The high-frequency inverter 2 and the matching circuit 3 are of a proportionate size as compared with the laser resonator, as shown in FIG. 2. Denoted at 8 is a laser beam output.

By installing the device on the head of a laser machining system or the tip end of a robot arm there is constructed a high-frequency discharge-exciting laser device.

As described above, by positioning the high-frequency inverter and the matching circuit near the optical resonator, the need for coaxial cable is dispensed with, and as a consequence impedance matching can easily be gained, and any shield to safeguard the components against radio disturbance is simplified.

Figure 3:
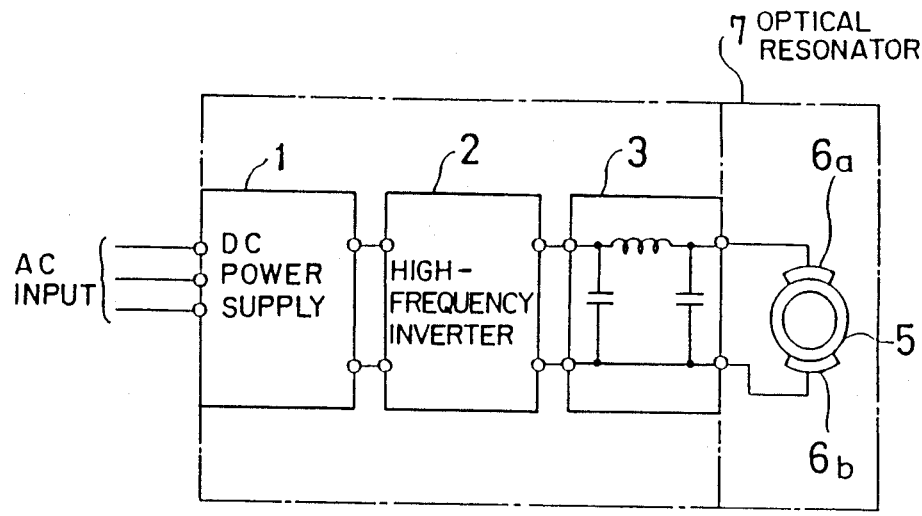
FIG. 3 is a circuit diagram of another embodiment of the present invention.

Another embodiment of the present invention will hereinafter be described with reference to the drawings. FIG. 3 is a circuit diagram of an embodiment according to the present invention. Those elements in FIG. 3 which are identical to those shown in FIG. 5 are denoted by identical reference numerals. Designated at 1 is a DC power supply including a regulator circuit for rectifying a three-phase AC input into a DC output and keeping the DC voltage at a constant level as required. A high-frequency inverter 2 converts the DC input into a high-frequency AC output having a frequency ranging from 1 to several MHz. A matching circuit 3 of the π-type serves to gain impedance matching between the output of the high-frequency inverter 2 and a laser tube (described later). The laser tube, denoted at 5, has electrodes 6a, 6b respectively at its opposite ends, and a laser medium gas is circulated in the laser tube 5. By applying high-frequency electric power to the electrodes 6a, 6b, an electric discharge is excited to oscillate and amplify a laser beam in the axial direction. The DC power supply, the high-frequency inverter 2, and the matching circuit 3 are disposed in the same place as that of the laser tube 5, so that the distance between the matching circuit 3 and the laser tube 5 is small and no coaxial cable is required therebetween. Impedance matching only needs to be considered between the high-frequency inverter 2 and the designed for its arrangement. Any shield for protection against radio disturbance is simple as the matching circuit 3 and the laser tube 5 may be shielded together.

Figure 4:
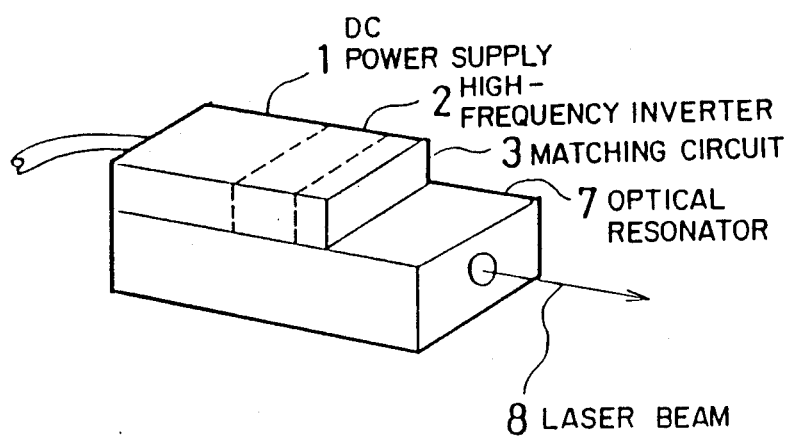
FIG. 4 is a perspective view of the other embodiment of the present invention.

FIG. 4 shows in perspective the high-frequency discharge-exciting laser device of FIG. 3. The DC power supply 1, the high-frequency inverter 2, and the matching circuit 3 are mounted on an upper surface of the optical resonator 7 including the laser tube 5. As shown, the distance between the matching circuit 3 and the optical resonator 7 is very small, and no coaxial cable needs to be used. The high-frequency inverter 2 and the matching circuit 3 are of a proportionate size comparable to the laser resonator, as shown in FIG. 4. Denoted at 8 is a laser beam output.

By installing the device on the head of a laser machining system or the tip end of a robot arm, there is constructed a high-frequency discharge-exciting laser device.

As described above, by positioning the DC power supply, the high-frequency inverter, and the matching circuit near the optical resonator, any coaxial cable is dispensed with, and as a consequence impedance matching can easily be gained, and any shield to safeguard the components against radio disturbance is simplified.

I claim:

1. A high frequency discharge-exciting laser device for oscillating a laser beam by high-frequency power, comprising:

a laser tube, having an impedance, in which a laser medium gas is circulated;

electrodes installed in the vicinity of said laser tube and imposed with the high-frequency power;

a DC power supply for rectifying a three-phase AC voltage to a DC voltage and issuing the DC voltage;

a high-frequency inverter circuit, having an impedance, coupled with said DC power supply for converting the DC voltage into the high-frequency power and issuing the high-frequency power;

a matching circuit coupled with said high-frequency inverter circuit and said electrodes for providing impedance matching between said high-frequency inverter circuit and said laser tube;

said high-frequency inverter circuit and said matching circuit are directly coupled to said laser tube; and said high-frequency inverter circuit, said matching circuit and said laser tube are coupled by a cable other than a coaxial cable, respectively, whereby said matching circuit directly matches the impedance of said high-frequency inverter circuit to the impedance of said laser tube.

2. A high-frequency discharge-exciting laser device according to claim 1, wherein said DC power supply is also directly coupled together with said high-frequency inverter circuit, said matching circuit and said laser tube, and wherein said laser device includes a shield for eliminating radio-wave interference.

3. A high frequency discharge-exciting laser device according to claim 2, wherein said laser tube and said electrodes comprise a optical resonator having upper and lower surfaces, and wherein said high-frequency inverter and said matching circuit are disposed on the upper surface of said optical resonator.

4. A high frequency discharge-exciting laser device according to claim 3, wherein said DC power supply is further disposed on the upper surface of said optical resonator.

5. A high frequency discharge-exciting laser device according to claim 1, wherein said laser tube and said electrodes comprise a optical resonator having upper and lower surfaces, and wherein said high-frequency inverter and said matching circuit are disposed on the upper surface of said optical resonator.

6. A high frequency discharge-exciting laser device according to claim 5, wherein said DC power supply is further disposed on the upper surface of said optical resonator.

* * * * *

UNITED STATES PATENT AND TRADEMARK OFFICE
CERTIFICATE OF CORRECTION

PATENT NO.    :   4,974,229
DATED         :   NOVEMBER 27, 1990
INVENTOR(S)   :   AKIRA EGAWA

It is certified that error appears in the above-identified patent and that said Letters Patent is hereby corrected as shown below:

Col. 3, line 57, after "the" insert --laser tube 5, and hence the matching circuit 3 can easily be--.

Signed and Sealed this

Twenty-first Day of April, 1992

Attest:

HARRY F. MANBECK, JR.

*Attesting Officer*          *Commissioner of Patents and Trademarks*